(12) United States Patent
Anelli et al.

(10) Patent No.: US 6,205,276 B1
(45) Date of Patent: Mar. 20, 2001

(54) MOISTURE-RESISTANT CABLE INCLUDING ZEOLITE

(75) Inventors: Pietro Anelli, Milan; Claudio Bosisio, Bergamo, both of (IT)

(73) Assignee: Pirelli Cavi e Sistemi S.p.A., Milan (IT)

( * ) Notice: Subject to any disclaimer, the term of this patent is extended or adjusted under 35 U.S.C. 154(b) by 0 days.

(21) Appl. No.: 09/020,401

(22) Filed: Feb. 9, 1998

Related U.S. Application Data (60) Provisional application No. 60/047,999, filed on May 28, 1997.

(30) Foreign Application Priority Data

Feb. 10, 1997 (IT) ................................................ MI97A0263

(51) Int. Cl.[7] ........................................................ G02B 6/44
(52) U.S. Cl. ............................................................... 385/100
(58) Field of Search ....................................... 385/100–114

(56) References Cited

U.S. PATENT DOCUMENTS

| | | |
|---|---|---|
| 2,882,243 | 4/1959 | Milton . |
| 2,882,244 | 4/1959 | Milton . |
| 3,130,006 | 4/1964 | Rabo et al. . |
| 3,130,007 | 4/1964 | Breck . |
| 4,717,236 | * 1/1988 | Dewing ................................ 385/101 |
| 6,005,192 | * 12/1999 | Mashikian et al. .............. 174/110 R |

FOREIGN PATENT DOCUMENTS

| | | |
|---|---|---|
| 0 714 042 A1 | 5/1996 | (EP) . |
| 2 158 263 | 11/1985 | (GB) . |
| 2 165 368 | 4/1986 | (GB) . |
| 2 183 365 | 6/1987 | (GB) . |
| WO 88/10000 | 12/1988 | (WO) . |
| WO 95/09426 | 4/1995 | (WO) . |

OTHER PUBLICATIONS

Y. Kawaguchi et al., "Colorant for Polyolefin Insulated Electric Wire", JP 56–149449, Patent Abstracts of Japan, vol. 006, No. 031, (Feb. 24, 1982).

* cited by examiner

Primary Examiner—Akm E. Ullah
(74) Attorney, Agent, or Firm—Finnegan, Henderson, Farabow, Garrett & Dunner, L.L.P.

(57) ABSTRACT

An optical fiber cable comprising a layer of polymer coating containing a zeolite. The zeolite in the polymer coating acts as a desiccant and reduces the relative humidity at the innermost region of the cable. As a result of the reduced relative humidity inside the cable, the optical fiber is protected from delamination.

23 Claims, 3 Drawing Sheets

MOISTURE-RESISTANT CABLE INCLUDING ZEOLITE

This application claims benefit of U.S. Provisional Application Ser. No. 60/047,999, filed May 28, 1997, and claims the right to priority based on Italian Patent Application No. MI97 A 000263, filed Feb. 10, 1997.

BACKGROUND OF THE INVENTION

The present invention relates to a coating for cables, which is capable of limiting the absorption of moisture by the cable.

Cables, in particular those for fiber optics telecommunications, have the disadvantage of the possible ingress of water, either in the liquid form (for example, phreatic water in the case of underground cables, or sea water in the case of submarine cables), or in vapor form (for example, atmospheric humidity), as a result of discontinuities due to faults or defective joints in the outer coating and, in particular in the case of cables without outer metal sheaths, as a result of the incomplete impermeability of the outer coating of the cable.

In particular, the optical fibers located inside such cables may be damaged by operation in conditions of high relative humidity (hereinafter termed "r.h."), for example for values of r.h. in excess of 80%. The main problem arising from the contact of the optical fibers with water is what is known as "delamination", in other words a possible detachment from each other of the various layers forming the coating of the glass fiber. These layers, which are generally polymer compounds based on acrylates or urethane-acrylates, are normally identified, starting with that in contact with the glass, as the primary coating, the secondary coating, the ink, and, in the case of a number of optical fibers joined to form a "ribbon", the common coating. The typical phenomena of delamination are those occurring between the glass and the primary coating of the fiber, between the ink and the secondary coating, and between the common coating and the ink.

Such delaminations may, on one hand, cause attenuation in the transmission of the signal, and, on the other hand, decrease the mechanical strength properties of the fiber.

Said problems are of particular significance for non-sealed cables, in other words those without welded or extruded metal outer sheaths, and in particular for what are known as "all-dielectric" cables, in other words those having external protection consisting solely of a polymer coating.

There are various documents which envisage the possibility of inserting into the cable particular compounds or materials capable of absorbing water which has penetrated accidentally into the cable.

For example, International Patent Application WO-A-88/10000 describes the use of a synthetic expandable powder substance in which the rapidity of inflation due to the absorption of water is obtained by reducing the particle size of the inflatable substance.

European Patent Application EP 714042 describes a packing containing inflatable moisture-absorbent polymer powders.

Patent GB 2165368 describes a solution for preventing the ingress of moisture into a fiber optics cable, consisting in filling the interstices of such a cable with a packing compound containing a desiccant material, in particular a zeolite.

Such documents therefore relate to solutions which envisage an absorption of water inside the cable, without consideration of the permeability of the outer coating. In general, in order to ensure satisfactory water absorption in the absence of a sealed metal coating, it is necessary to use considerable quantities of absorbent material, with consequent manufacturing problems. The applicant has also observed that, in the presence of large quantities of absorbed water inside the cable, a release of vapor is possible as a result of heating cycles.

SUMMARY OF THE INVENTION

The applicant has observed that a high value of r.h. inside the cable, due either to direct water penetration or to the release of water vapor by the absorbent material as a result of heating cycles, may produce said phenomena of delamination, and that such a value of r.h. may advantageously be limited by a particular choice of the characteristics of the outer coating of the cable.

It has now been found that, by adding a predetermined quantity of zeolites to the cable coating, it is possible to limit the ingress of water to the inside of the cable, for a sufficiently long period. The presence of such a predetermined quantity of zeolites in the cable coating also enables a low value of r.h. to be maintained in the innermost region of the cable, particularly in the region in which the optical fibers are housed.

One aspect of the present invention therefore relates to a cable characterized in that it has at least one layer of polymer coating comprising a predetermined quantity of zeolite such that it limits the increase of relative humidity (r.h.) inside the cable. In the present description, the expression "limits the increase of r.h." refers to the fact that a polymer coating containing zeolite according to the invention is capable, when its outer surface is brought into presence of r.h. values of 85–95%, of maintaining, in the environment in contact with its inner surface, r.h. values of less than 70% for at least 2500 hours, or for a period approximately twice that found for a similar coating consisting of the polymer alone.

A further aspect of the present invention relates to a cable with a layer of polymer coating comprising a predetermined quantity of zeolite, characterized in that it also comprises at least one layer of polymer coating without zeolite, which is located in a radially outer position with respect to the coating containing zeolite.

Also included in the present invention is a method for limiting the absorption of water by a cable, characterized in that a predetermined quantity of zeolite is added to at least one coating layer of said cable.

A preferred application of the present invention relates to the use of said coatings in fiber optics cables of the non-sealed type, in other words those which do not have welded or extruded metal outer sheaths, and in particular for fiber optics cables known as "dielectric" cables, in other words those having outer protection consisting solely of a polymer coating.

DETAILED DESCRIPTION OF THE INVENTION

Figure 1:
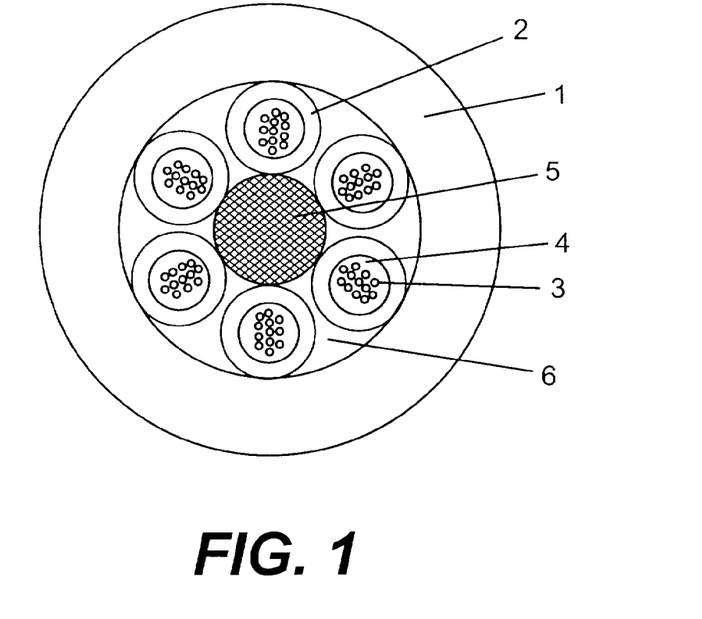
FIG. 1 is a sectional view of a moisture resistant cable according to the present invention.

FIG. 1 is a sectional view of a fiber optics cable consisting of an outer sheath of polymer material (1), a certain number of tubes (2), also of polymer material, within which are housed the optical fibers (3), normally embedded in a packing material (4) which has the purpose of preventing the longitudinal propagation of water in case of accidental rupture; the tubes containing the optical fibers are wound around a central support (5) normally made of glass-fiber reinforced plastic and capable of limiting the thermal contractions of the cable (the stranding may be of the continuous or alternate type, commonly called S—Z). Optionally, there may be inserted between the outer sheath (1) and the tubes (2) an interstitial packing material (6) capable of penetrating into the interstices between the tubes and the coating, between one tube and the next, and between the tubes and the support, in order to limit the longitudinal propagation of water inside the cable.

Figure 2:
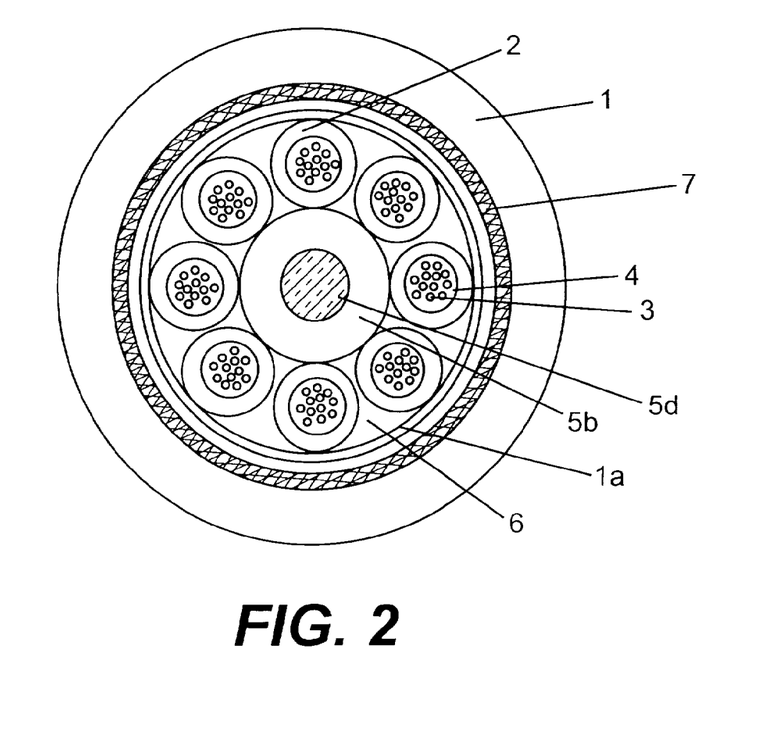
FIG. 2 is a sectional view of a moisture resistant cable comprising a tensile reinforcing layer.

FIG. 2 is a sectional view of a cable similar to that described in FIG. 1, with the difference that inside the coating (1) there is a tensile reinforcing layer (7) (for example a glass fiber of polyaramid fiber such as the product known commercially as Kevlar®); additionally, the tubes (2) containing the optical fibers are surrounded by a sheath of polymer material (1a) having one or more layers. Additionally, according to the embodiment shown in FIG. 2, the central support (5) comprises a core (5a), made for example of glass-fiber reinforced plastic or similar materials, capable of limiting the thermal contractions of the cable, and a coating (5b), made for example of polymer material, such that it increases the diameter of the core to a value capable of receiving the desired number of tubes wound around it.

Figure 3:
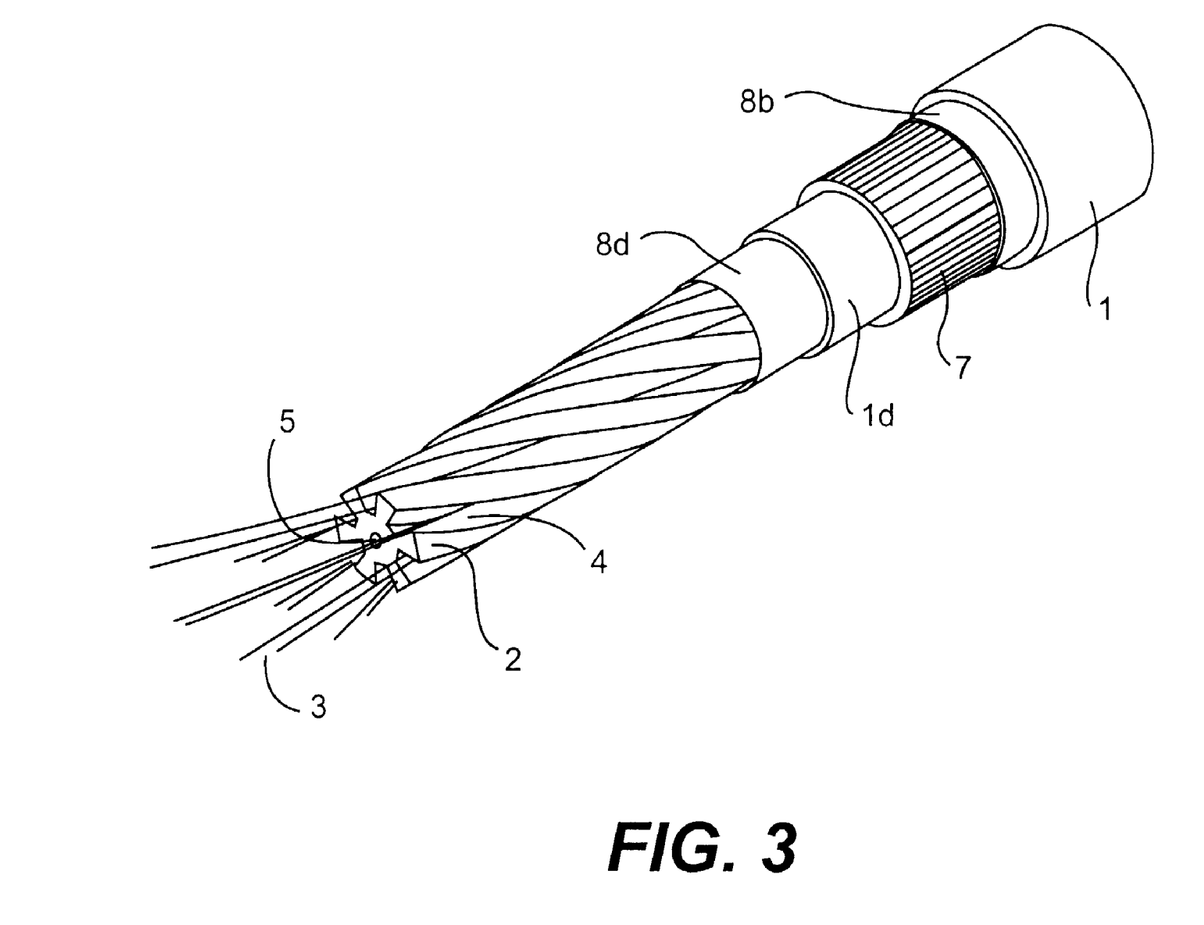
FIG. 3 is a perspective view of a moisture resistant cable according to the present invention.

FIG. 3 is a perspective view of a cable according to the invention in which the optical fibers (2) are located in housings in a central grooved core (2) made of polymer material, which if necessary may be in contact with a suitable packing (4); the grooved core may optionally contain a central support made of glass-fiber reinforced plastic (5). The grooved core is therefore surrounded by a set of sheaths (1, 1a) and by a reinforcing layer (7) as described previously; optionally, the cable structure may also comprise a tape for the purposes of containment and/or protection of the fibers and a wet-expanding tape (8b) (for example a polyester or polyamide tape filled with wet-expanding material, such as sodium polyacrylate) for the purpose of limiting the longitudinal propagation of water inside the cable.

Obviously, these figures show only some of the possible embodiments of fiber optics cables in which the present invention can be used advantageously. It is evident that suitable modifications known in the art may be made to these embodiments, without the implication of limitations on the application of the present invention. For example, a wet-expanding tape (of the type described previously) suitable for the same purpose of limiting the longitudinal propagation of water inside the cable may be wound around the tubes (2) as an alternative or in addition to the interstitial packing (6). Further solutions will be easily understood by those skilled in the art, who will be capable of evaluating the most convenient solution with respect, for example, to the cost, the type of cable installation (overhead, in conduits, buried directly in the soil, inside buildings, submarine, etc.), the operating temperature of the cable (maximum and minimum temperatures, thermal variations of the environment) and so on.

In the present description, the term "zeolite" is intended to indicate metallic aluminosilicate compounds of natural or synthetic origin, the synthetic compounds also being known as "molecular sieves". These compounds are generally formed from combined oxides of silicon (in other words silica, $SiO_2$), aluminum (in other words alumina, $Al_2O_3$) and metals, in particular alkaline or alkaline-earth metals such as lithium, sodium, potassium, magnesium, calcium, strontium and barium. These compounds are normally indicated in their hydrated form by the following general formula: $M_{2/m}O.Al_2O_3.xSiO_2.yH_2O$, where M represents a metallic cation and m its valence, while x and y are stoichiometric factors which vary according to the particular type of compound; indicative values of the parameters x and y are $1.35<x<9$ and $0<y<6$. Alternatively, these compounds can also be identified in crystallographic terms by the following general unit cell formula: $M_{n/m}[(AlO_2)_n(SiO_2)_w].y'H_2O$, where M and m are defined as above, while n, w and y' vary considerably according to the composition of the unit cell and its dimensions; for example, for commercially available synthetic zeolites, possible values are:

$n=w=12, y'=27$.

A description of zeolites of natural origin is given in "Encyclopedia of Chemical Technology", Kirk-Othmer, Interscience Ed. (N.Y.), 1954(Vol. 12).

Some types of molecular sieves and the processes for their preparation are described in numerous publications and patents, including U.S. Pat. No. 2,882,243, U.S. Pat. No. 2,882,244, U.S. Pat. No. 3,130,006 and U.S. Pat. No. 3,130,007.

According to the present invention, the zeolites mentioned above are advantageously usable as a desiccant additive to the cable coating. In order to perform their desiccant function, these compounds are used in the corresponding anhydrous form. In particular, it is preferable to use zeolites of synthetic origin, in which the alkaline or alkaline earth metals forming the corresponding oxides are preferably chosen from sodium, potassium, calcium and mixtures of these, since they have a smaller and more uniform particle size. Indicative examples of such zeolites of synthetic origin are identified by the following unit cell formulae: a) $Na_{12}[(AlO_2)_{12}(SiO_2)_{12}]$, b) $K_{12}[(AlO_2)_{12}(SiO_2)_{12}]$, c) $Ca_6[(AlO_2)_{12}(SiO_2)_{12}]$.

The zeolite, preferably in powder form, is added to the basic polymer matrix of the coating; the size of the zeolite particles generally ranges from 0.01 to 100 μm, and preferably from 0.1 to 5 μm. The mean porosity of these particles is preferably less than 6 Ångstrom, particles with a mean porosity of between approximately 3 and 4 Ångstrom being particularly preferred.

The concentration of zeolite may vary from 30% to 70% by weight of the coating, and preferably between 35% and 60%, a proportion by weight of approximately 50% being particularly preferred.

Examples of commercially available zeolites which may be used advantageously for the purpose are "Molecular Sieve Type 3A" or "Type 4A" (UOP, Union Carbide), and "drying agent 20857-4" or "20859-0" (Aldrich).

The polymer matrix of the coating is formed by a polymer, a copolymer or a polymer mixture, chosen from those generally used in the art, such as polyolefins, olefin/ester copolymers, polyesters, polyethers, polyether/polyester copolymers and mixtures of these. Examples of these polymers are polyethylene (PE), in particular low-density PE (LDPE), medium-density PE (MDPE), high-density PE (HDPE) and linear low-density PE (LLDPE); polypropylene (PP); ethylene-propylene rubbers (EPR), in particular ethylene-propylene copolymer (EPM) or ethylene-propylene-diene terpolymer (EPDM); natural rubber; butyl rubber; ethylene/vinyl acetate copolymer (EVA); ethylene/acrylate copolymers, in particular ethylene/methyl acrylate (EMA), ethylene/ethyl acrylate (EEA), ethylene/butyl acrylate (EBA); ethylene/α-olefin copolymer; halogenated polymers, in particular polyvinyl chloride (PVC); polyurethane (PUR); polyamides, aromatic polyesters, such as polyethylene terephthalate (PET) or polybutylene terephthalate (PBT); and copolymers or mechanical mixtures of these. It is preferable to use polymer matrices with PE, EVA or PP-based mixtures. Particularly preferred are PP and PE-based mixtures, in particular MDPE. Specific examples of such polymer matrices are: PP; MDPE; LDPE; LLDPE; copolymer of PE (for example MDPE) with EVA, in particular 50%—50% copolymers; EPR-based mixture with PE/EVA copolymer. In particular, with reference to the figures, it is preferable to use mixtures based on PBT, HDPE or PP for the tubes (2); MDPE, PUR or PP for the inner sheath (1a); and EPR, LDPE or MDPE for the outer sheath (1).

The polymeric composition of the coating may also contain other conventional additives known in the art, such as antioxidants, cross-linking agents, strengtheners, coupling agents, mineral fillers, antistatic agents, surfactants, UV stabilizers, pigments, bond separating agents, plasticizers, lubricants, viscosity modifiers, extender oils, metal deactivators, and fireproofing and flame retardant agents.

For example, suitable antioxidants commonly used in the art are aromatic polyamines, sterically hindered phenols, phosphites and phosphonites. Examples of these antioxidants are polymerized 2,2,4-trimethyl-1,2-dihydroquinoline, tetrakis methylene (3,5-di-terbutyl-4-hydroxy-hydrocinnamate)methane, bis (3,5-di-terbutyl-4-hydroxy-hydrocinnamate), n-octadecyl-3-(3',5'-di-t-butyl-4-hydroxyphenyl)propionate and tris (2,4-di-terbutylphenyl) phosphite.

Examples of suitable cross-linking systems are those of the peroxide or silane type. It is also possible to use a silane-based cross-linking system, with peroxides which act as agents for attaching the silanes to the base polymer. Examples of peroxides which can be conveniently used both as cross-linking agents and as silane attaching agents are di(terbutylperoxypropyl-(2)-benzene, bis-(terbutylperoxy) diisopropyl benzene, dicumyl peroxide, diterbutyl peroxide, benzoyl peroxide, terbutylcumyl peroxide, 1,1-di (terbutylperoxy)-3,3,5-trimethyl-cyclohexane, 2,5-bis (terbutylperoxy)-2,5-dimethylhexane, terbutylperoxy-3,5,5-trimethylhexanoate, and ethyl 3,3-di(terbutylperoxy) butyrate. Examples of silanes which can be conveniently used are the ($C_1$–$C_4$)alkyloxy silanes, and in particular the vinyl ($C_1$–$C_4$)alkyloxy silanes; compounds suitable for the purpose are, for example, γ-methacryloxy-propyltrimethoxy silane, methyltriethoxy silane, methyltris-(2-methoxyethoxy) silane, dimethyldiethoxy silane, octyltriethoxy silane, isobutyltriethoxy silane, isobutyl-trimethoxy silane, vinyltrimethoxysilane, vinyltrimethoxysilane, vinyltriethoxysilane, vinyldimethoxyethoxysilane, vinyltris-(2-methoxyethoxy) silane, and mixtures of these.

These cross-linking systems also comprise a cross-linking catalyst, which is chosen from those known in the art; for example, in the case of cross linking with silanes, it is convenient to use tin dibutyl dilaurate.

With reference to the drawings, a polymer mixture according to the invention may, for example, be used as a coating on one or more of the following components of the cable: the outer sheath (1), the tubes (2) containing the optical fibers, and the inner sheath (1a).

A coating according to the invention, whose outer face is in the presence of water vapor, can be used to obtain, in the environment in contact with the inner face, the same values of r.h. as those measured for an identical coating without zeolites, for markedly longer periods. For example, according to a test based on the standard ASTM E96, modified as described in the article by P. Anelli et al., "Water getting flood compound for dielectric cables", IWCS (International Wire and Cable Symposium) proceedings, 1995, pp. 756–761, a test piece having an MDPE-based coating with a 50% zeolite filler takes more than 50 times the time taken by a non-filled MDPE-based coating to reach a relative humidity of 30%.

It has also been observed that it is particularly advantageous to join two layers of coating, of which only one has zeolite added according to the present invention.

In particular, it as been observed that it is possible to retard the increase of r.h. inside the cable further when the coating of the cable is formed by a double layer where the outer layer (in other words the layer in contact with the water) is without zeolites while the inner layer contains zeolites. According to one such embodiment, it is therefore possible to maintain the r.h. inside the cable at low values for even longer periods than those obtainable with a single zeolite-containing layer.

According to a preferred aspect of the invention, both layers are formed by the same polymer matrix. The presence of the polymer layer without zeolite joined to the polymer layer containing zeolite also provides better mechanical strength properties than a coating of identical thickness formed by a single layer containing zeolites.

Consequently, a further aspect of the present invention consists of a cable with a layer of polymer coating comprising a predetermined quantity of zeolite, characterized in that is also comprises at least one layer of polymer coating without zeolite, this being located in a radially outer position with respect to the coating containing zeolite, the polymer matrix of the two layers being preferably substantially the same. The quantities and types of zeolite are as specified above.

As stated above, this double-layer coating may also be used as the material for the various components of a fiber optics cable, for example for the outer sheath (1), the tubes (2) containing the optical fibers, and/or the inner sheath (1a).

In addition to the direct joining of two polymer layers, of which one contains zeolites and the other does not, it is also possible to provide combined solutions of single coatings without and containing zeolite. For example, it may be advantageous to join an outer sheath (1) without zeolites to an inner sheath (1a) and/or tubes (2) containing zeolite.

It is also possible to combine, in said components (1), (1a) and (2) of the cable, a plurality of double-layer coatings, or one or more single-layer coatings with one or more double-layer coatings. For example, it would be convenient to join an outer sheath (1), formed by a double-layer coating, with an inner sheath (1a) formed by a single-layer coating containing zeolite or by a double-layer coating.

Typically, the mixture for producing a coating according to the invention is prepared by mixing said polymer components with the zeolite, and if necessary with other optional additives mentioned previously, for example in an internal mixer of the Banbury type or in other mixers of the continuous type such as the Ko-Kneader (Buss) or the twin-screw type. Typically, the mixture thus produced is granulated and dried.

When a cross-linked product is to be obtained, the granules of said mixture are mixed with the appropriate cross-linking system, for example in a continuous mixer. The cross-linking catalyst is preferably added subsequently, during the phase of preparation of the cable.

During the preparation of the base mixture, in addition to the normal precautions to be taken (for example, the prevention of what is known as the "scorching" of the mixture as a result of working at excessively high temperatures), the environment in which the mixture is processed (and stored) should be kept as moisture-free as possible, to prevent the zeolite from absorbing, even if only partially, the ambient moisture.

The polymer mixture obtained in this way may then be used, as described previously, as a coating for cables, in particular for "all-dielectric" fiber optics cables. With specific reference to the drawings, the mixture according to the invention may be used for one or more of the following components of the cable: the outer sheath (1), the tubes (2) containing the optical fibers, and the inner sheath (1a).

The preparation of the cable containing the coating according to the invention is then carried out as known in the art. For example, in order to produce a cable as shown in FIG. 2, with the tubes (2) and the inner sheath (1a) consisting of a single layer of coating (with or without zeolite), and with the outer sheath (1) formed by a double layer of coating as described previously, it is possible to proceed as follows:

- the tubes (2) are extruded, the optical fibers and the packing being included inside them at the time of extrusion;
- the tubes are wound around the central support (5), and may be taped subsequently (with PP or PET tapes, for example) to ensure the compactness of the optical cable which is collected on a reel;
- the inner sheath (1a) is extruded on to the optical cable produced in this way;
- after the cable has been covered with an aramid reinforcing fiber, and if necessary with a wet-expanding tape, the double-layer outer sheath (1) is applied with a double-head extruder.

When the mixture containing zeolite according to the invention is extruded, it is necessary to allow for the increased viscosity due to the mineral filler, by using an appropriate thermal profile and speed. Additionally, owing to the hygroscopicity of these mixtures, particular attention must be paid to the avoidance of contact of the mixture with water as far as possible; it is therefore advisable to keep the granules of mixture in a moisture-free place until they are used for extrusion, to flush the hopper with dry air and/or heat it until the processing of the charge is complete, to avoid the use of water as cooling fluid, and, if the mixture is cross-linked, not to use water vapor for the cross-linking.

A cable according to the present invention, in particular a cable with a double layer of coating, is capable of maintaining its characteristics for a sufficient number of years with respect to the average life of normal cables.

The present invention is further illustrated by means of the following examples.

EXAMPLE 1

Preparation of single-layer coating and impermeability characteristics

Compositions were produced with percentages of zeolites (Molecular sieves Type 3A, UOP) of 0% (control test), 30% and 50% by weight with respect to the base polymer and the following polymer matrices:

MDPE medium density polyethylene

MDPE/EVA 50% MDPE and ethylene and vinyl acetate copolymer

PP polypropylene

LDPE low density polyethylene

LLDPE linear low density polyethylene

For this purpose, approximately ⅔ of the total quantity of polymer is placed in a Banbury mixer at a temperature close to the melting point, and mixed for approximately 2 minutes. The remainder of the polymer is then added with the zeolite filler, previously dried in an oven overnight in a vacuum at 250° C., and mixing is continued for a further 3 minutes. The mixture thus obtained is transferred to an open roller mixer preheated to a temperature close to the melting point of the mixture, and processed for approximately two minutes to produce a sheet of mixture. The sheet of mixture produced in this way is immediately press-molded into a plate of the desired thickness.

Specimens with a thickness of 1 mm were taken from the molded plates with the above composition, and their water absorption was measured, starting with initial r.h. values of 10–20%, using a test derived from those specified in the standard ASTM E96 and described on p. 3 of the previously cited article by P. Anelli et al., IWCS proceedings, 1995. Briefly, a plate is fixed to a metal container (30 cm$^3$) inside which a humidity sensor (Parametrics Hybrid cap 99I) is fitted, with an O-ring seal and bolts. The system is assembled in a "glove box" under a continuous flow of dry air, such that a r.h.$\leq$10% is maintained by means of a suitable water and glycerin mixture. The plate therefore has one face (the outer face) exposed to said values of r.h., while on the other face (the inner face), in other words inside the metal container, the variation of the r.h. is continuously measured by means of the humidity sensor (with a sensitivity of approximately 2 mV/% r.h.).

Table 2 shows the times required to reach values of r.h. of 30%, 50% and 70% in the environments in contact with the inner faces of the test plates of the various materials prepared as described above.

TABLE 2

Comparison between the various polymer formulations

| polymer | content of zeolites (%) | time to r.h. = 30% (hours) | time to r.h. = 50% (hours) | time to r.h. = 70% (hours) |
| --- | --- | --- | --- | --- |
| MDPE | 0 | 32 | 180 | 1200 |
| MDPE | 30 | 1600 | 2500 | 3000 |
| MDPE | 50 | 1900–2200 | 2500–2700 | 3200–3500 |
| MDPE/EVA | 0 | <100 | <100 | 230 |
| MDPE/EVA | 50 | 290 | 350 | 450 |
| PP | 0 | <200 | 320 | >2000 |
| PP | 30 | 790 | 1220 | 3200 |
| PP | 50 | 1240 | 1520 | >3200 |
| LDPE | 0 | <100 | <100 | 500 |
| LDPE | 30 | 1300 | 1900 | 2500 |
| LDPE | 50 | 1300 | 2000 | >2500 |
| LLDPE | 0 | <100 | 200 | 2200 |
| LLDPE | 30 | <100 | 1500 | 2500 |
| LLDPE | 50 | 1200 | 1800 | >2500 |

The data in Table 2 shows that for most of the test pieces consisting of polymers filled with zeolite there is a marked improvement in the capacity of limiting the increase of r.h. on the inner face of the test plates with respect to the test pieces consisting only of the corresponding polymers. In particular, it will be observed that the presence of zeolite in the coating is capable of limiting the r.h. to values of approximately 70% for at least 2500 hours. A special mention should be given to the MDPE/EVA mixture, which shows a time of 230 to reach a r.h. of 70%; the presence of zeolite in the coating, however, is capable of doubling the time required to reach the same value of 70% r.h. It will also be observed that for some types of polymer, more than satisfactory results are achieved even with a zeolite content of 30%.

EXAMPLE 2

Comparison of single- and double-layer coatings

Two test pieces with a thickness of 0.8 mm were prepared according to the description in Example 1, with the following compositions:

A) 0.8 mm, MDPE

B) 0.8 mm, MDPE+50% zeolite.

Another two 0.8 mm thick test pieces were prepared from two joined 0.4 mm layers of polymer material, one of these containing a 50% zeolite filler of the type used in Example 1.

These test pieces were prepared by press-molding the individual plates with a thickness increased by 20% and subsequently joining, again by press-molding, the two plates, to obtain the final thickness of the test piece.

The two test pieces are identified as follows:

C) double layer with 0.4 mm MDPE inside and 0.4 mm MDPE+50% zeolite outside

D) double layer with 0.4 mm MDPE+50% zeolite inside and 0.4 mm MDPE outside

Table 3 shows the measured time taken for each test piece to reach a r.h. of 30%, 50%, and 70%, according to the test illustrated in Example 1, starting from values of r.h. of 10–20%.

TABLE 3

|  | Test piece A | Test piece B | Test piece C | Test piece D |
| --- | --- | --- | --- | --- |
| time to r.h. = 30% (hours) | <50 | 1900–2200 | <100 | >5000 |
| time to r.h. = 50% (hours) | <100 | 2500–2700 | 700 | >5000 |
| time to r.h. = 70% (hours) | 1500 | 3200–3500 | 2000 | >5000 |

Note: The values for test piece D refer to a test still in progress.

As may be deduced from the data in Table 3, a coating consisting of a double layer, the inner of which is filled with zeolite, provides excellent results in terms of resistance to the increase of r.h. inside the cable, when the cable is placed in contact with an environment with a relative humidity of 100%, the model reported in the previously cited article by P. Anelli et al., IWCS proceedings, was used. Certain typical parameters of the materials, such as the diffusion coefficient and the solubility of the water vapor, were determined by this method. These parameters are determined by the results of tests of absorption in the vapor phase, such as ASTM D570-77, using formulae and equations described in various reference books such as Carslaw-Jaeger, "Conduction of heat in solids", Oxford Ed., 1973. For this purpose, tests of absorption of vapor from the atmosphere at 75% r.h. at 25° C. (partial vapor pressure 17.8 mm Hg) were carried out on plates of the materials in question, the quantity of water absorbed being measured by a gravimetric method; a set of successive measurements was used to plot a graph of weight increase of the test piece as a function of time. The diffusion coefficient "D" of the water in the plate (see the previously cited book, pp. 58–62) is derived from the initial slope of the graph, according to the equation $$\frac{dw}{d\sqrt{t}} = w_\infty \sqrt{\frac{D}{16\pi}} L$$

where w is the quantity of water absorbed at the time t, $w_\infty$ is the asymptotic quantity and L is the thickness of the test piece. The solubility "S" of the water in the polymer at the test temperature is found from the asymptotic quantity of the graph, by dividing by the volume of the test piece and by the saturated vapor pressure at which the test was carried out.

Table 1 shows the values of S and D calculated for some types of polymers containing different quantities of zeolite (for the MDPE polymer not containing zeolite, the following values are reported in the literature: $D=1.5\times10^{-7}$ and $S=1.2\times10^{-6}$).

TABLE 1

| polymer | content of zeolites (%) | S (g/cm$^3$ mm Hg) | D (cm$^2$/s) |
| --- | --- | --- | --- |
| MDPE | 20% | 2.00 10$^{-3}$ | 4.28 10$^{-10}$ |
| MDPE | 25% | 2.68 10$^{-3}$ | 2.84 10$^{-10}$ |
| MDPE | 30% | 3.65 10$^{-3}$ | 1.14 10$^{-10}$ |
| MDPE | 50% | 5.98 10$^{-3}$ | 2.51 10$^{-10}$ |
| MDPE/EVA | 50% | 6.0 10$^{-3}$ | 1.90 10$^{-9}$ |
| PP | 30% | 3.56 10$^{-3}$ | 1.60 10$^{-10}$ |
| PP | 50% | 5.86 10$^{-3}$ | 3.35 10$^{-10}$ |
| LDPE | 30% | 3.63 10$^{-3}$ | 3.31 10$^{-10}$ |
| LDPE | 50% | 5.94 10$^{-3}$ | 3.10 10$^{-10}$ |
| LLDPE | 30% | 3.63 10$^{-3}$ | 2.13 10$^{-10}$ |
| LLDPE | 50% | 5.94 10$^{-3}$ | 2.55 10$^{-10}$ |

These parameters were used to calculate the effect of the presence of absorbent layers on the variation of the relative humidity inside a cable, in conditions in which 100% r.h. is always maintained on the outer surface of the outer layer (contact with water), a zero flow of moisture at the inner surface of the inner layer being specified (in other words, it is assumed that all the water diffused in the cable accumulated in the double layer forming the sheath). This is evidently a pessimistic assumption, since it disregards the presence inside the cable structure of elements having a non-negligible absorption capacity (aramid fibers, polyurethane, and water-absorbent tapes or packing as described previously) which have the effect of reducing the r.h. inside the cable.

Figure 4:
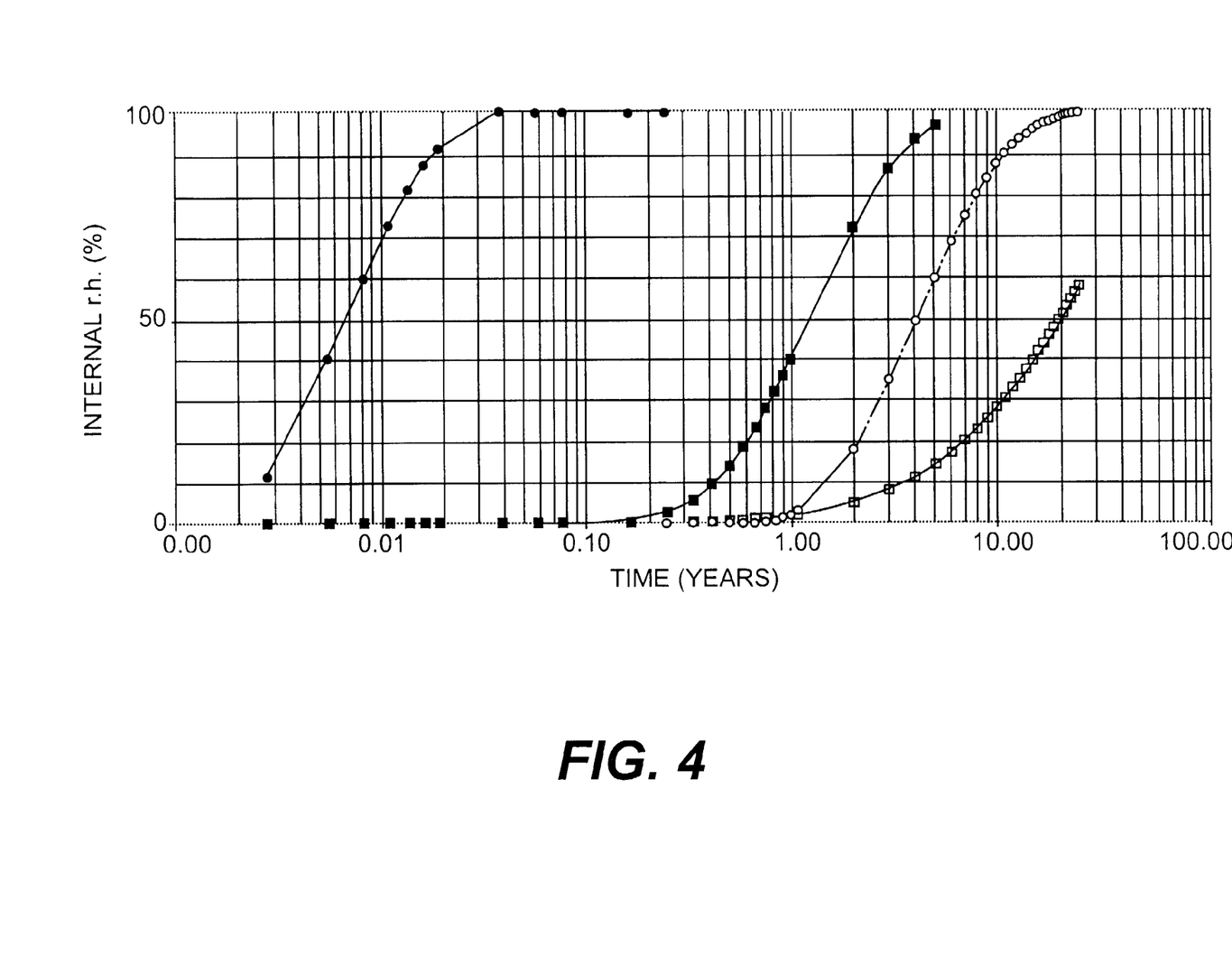
FIG. 4 is a plot of the relative humidity on the inner surface of an MDPE-based coating as a function of time.

In this prudent representation, the solution of the diffusion equation (see the previously cited book, pp. 323–325 and 345–347) gives a graph which shows, for each coating the variation of the r.h. on the inner surface of the coating as a function of time. FIG. 4 shows an example of such a graph, plotted for some MDPE-based coatings with a thickness of 3 mm, identified thus in the graph:

● Single layer of MDPE

○ Single layer of MDPE containing 50% zeolite

■ Double layer: inner (thickness 1.5 mm)=MDPE; outer (1.5 mm)=MDPE with 50% zeolite □ Double layer: inner (thickness 1.5 mm)=MDPE with 50% zeolite; outer (1.5 mm)=MDPE By the simulation described above, it was found that a cable coated with a polymer coating containing zeolite, in particular a coating formed by a double layer whose inner layer is filled with at least 30% zeolite, when exposed to values of relative humidity in excess of 90% at ambient temperature, is capable of maintaining inside it values of relative humidity of less than 80% for at least 20 years.

In the case of an MDPE-based coating, it was also found that a sheath with a thickness of at least 2.5 mm, and preferably at least 3 mm approximately, formed by a double layer of polymer, whose inner layer is filled with 50% zeolite, is capable of maintaining a percentage of relative humidity below 60% in the environment in contact with the inner surface after 20 years of exposure of its outer surface to a r.h. of 100%.

It has also been observed that the thicknesses of the individual layers may vary over rather wide ranges, without a negative effect on the moisture resistance properties of the coating; for example, in the case of said MDPE-based coating with a thickness of approximately 3 mm, in order to maintain a percentage of relative humidity below 60% in the environment in contact with the inner surface, the thickness of the outer layer (without zeolite) may vary from approximately 0.8 mm (approximately 25% of the total thickness) to approximately 2.5 mm (approximately 80% of the total).

Furthermore, since the layer without zeolite also has the purpose of imparting a degree of mechanical strength to the coating, the thickness of said layer will depend on the specific properties of mechanical strength which are to be imparted to the cable coating. In general, it is preferable to use a double-layer coating in which the inner layer (containing zeolite) accounts for approximately 50% of the total thickness.

What is claimed is:

1. Cable comprising:
   at least one layer of polymer coating including a predetermined quantity of zeolite for limiting an increase of relative humidity inside the cable;
   wherein said at least one layer of polymer coating contains 30% to 70% by weight of zeolite.

2. Cable as claimed in claim 1, wherein said at least one layer of polymer coating including zeolite, when its outer surface is placed in the presence of values of relative humidity of 85–95%, is capable of maintaining, in the environment in contact with its inner surface, values of relative humidity below 70% for at least 2500 hours.

3. Cable as claimed in claim 1, wherein a percentage of zeolite in the at least one layer of polymer coating varies from 35% to 60% by weight.

4. Cable as claimed in claim 1, wherein the zeolite comprises particles having a size of at least 0.01 $\mu$m.

5. Cable as claimed in claim 1, wherein the zeolite comprises particles that vary in size from 0.1 to 5 $\mu$m.

6. Cable as claimed in claim 1, wherein the zeolite comprises particles having a mean pore size of less than 6Å.

7. Cable as claimed in claim 1, wherein the zeolite comprises particles having a mean pore size of between approximately 3 and 4Å.

8. Cable as claimed in claim 1, wherein the coating comprises a basic polymer matrix formed by one of the following polymer materials: polyethylene (PE), in particular low-density PE (LDPE), medium-density PE (MDPE), high-density PE (HDPE) and linear low-density PE (LLDPE); polypropylene (PP); ethylene-propylene rubbers (EPR), in particular ethylene-propylene copolymer (EPM) or ethylene-propylene-diene terpolymer (EPDM); natural rubber; butyl rubber; ethylene/vinyl acetate copolymer (EVA); ethylene/acrylate copolymers, in particular ethylene/methyl acrylate (EMA), ethylene/ethyl acrylate (EEA), ethylene/butyl acrylate (EBA); ethylene/α-olefin copolymer; halogenated polymers, in particular polyvinyl chloride (PVC); polyurethane (PUR); polyamides; polyesters, such as polyethylene terephthalate (PET) or polybutylene terephthalate (PBT); and copolymers or mechanical mixtures of these.

9. Cable as claimed in any of the preceding claims 1 to 8, characterized in that said cable is a dielectric cable comprising at least one housing and at least one optical fiber located inside said housing.

10. Cable as claimed in claim 9, wherein said cable comprises an outer polymer coating sheath, at least one inner polymer sheath, and a set of tubes of polymer material in which the at least one optical fiber is housed.

11. Cable as claimed in claim 10, wherein the outer coating sheath of said cable comprises a polymer layer containing zeolite.

12. Cable as claimed in claim 10, wherein the inner polymer sheath of said cable comprises a polymer layer containing zeolite.

13. Cable as claimed in claim 10, wherein the tubes of said cable comprise a polymer coating layer containing zeolite.

14. Cable as claimed in claim 14, further comprising at least one layer of polymer coating without zeolite, said layer being located in a radially outer position with respect to the at least one layer of polymer coating containing zeolite.

15. Cable as claimed in claim 14, wherein said at least one layer of polymer coating layer without zeolite is placed in direct contact with the at least one layer of polymer coating containing zeolite.

16. Cable as claimed in claim 15, wherein a total thickness of all polymer coating layers is at least 2.5 mm.

17. Cable as claimed in claim 15 or 16, wherein the at least one layer of polymer coating containing zeolite represents approximately 50% of the total thickness of all polymer coating layers.

18. Cable as claimed in claim 15 or 16, wherein the at least one layer of polymer coating without zeolite has a basic polymer matrix that is substantially the same as that of the at least one polymer coating containing zeolite.

19. Cable as claimed in claim 1, wherein said at least one layer of polymer coating including zeolite, when its outer surface is placed in the presence of values of relative humidity of 85–95%, is capable of maintaining, in the environment in contact with its inner surface, values of relative humidity below 70% for a period approximately twice that found for a similar layer of polymer coating that does not include zeolite.

20. Cable comprising a polymer coating layer, wherein said polymer coating layer contains a predetermined quantity of zeolite such that, when said cable is exposed to values of relative humidity in excess of 90% at ambient temperature, said polymer coating layer is cable of maintaining relative humidity value inside the cable of less than 80% for at least 20 years.

21. Cable as claimed in claim 20, wherein said predetermined quantity of zeolite in the coating varies from 30% to 70% by weight of the polymer coating layer.

22. Method for limiting the increase of relative humidity inside a cable, said method including the step of adding a predetermined quantity of zeolite to at least one coating layer of said cable;
   wherein said predetermined quantity of zeolite varies from 30% to 70% by weight of said at least one coating layer.

23. Method as claimed in claim 22, wherein said method further comprises the step of including within the cable an outer layer of polymer material without zeolite located radially outwardly from a radially inner layer of polymer material containing said predetermined quantity of zeolite.

* * * * *

UNITED STATES PATENT AND TRADEMARK OFFICE
CERTIFICATE OF CORRECTION

PATENT NO. : 6,205,276 B1
DATED : March 20, 2001
INVENTOR(S) : Anelli et al.

It is certified that error appears in the above-identified patent and that said Letters Patent is hereby corrected as shown below:

<u>Column 12, claim 9,</u>
Lines 1-2, "any of the preceding claims 1 to 8, characterized in that" should read
-- claim 1, wherein --;

<u>Column 12, claim 14,</u>
Line 17, "claim 14" should read -- claim 1 --; and

<u>Column 12, claim 20,</u>
Line 47, "is cable" should read -- is capable --.

Signed and Sealed this

Sixteenth Day of April, 2002

Attest:

JAMES E. ROGAN
*Director of the United States Patent and Trademark Office*

*Attesting Officer*